(12) United States Patent
Leonard (10) Patent No.: US 9,261,157 B2
(45) Date of Patent: Feb. 16, 2016

(54) AIR SPRING MODULAR PISTON

(75) Inventor: Joshua R. Leonard, Noblesville, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 29 days.

(21) Appl. No.: 13/460,388

(22) Filed: Apr. 30, 2012

(65) Prior Publication Data

US 2012/0248667 A1    Oct. 4, 2012

Related U.S. Application Data (63) Continuation of application No. 11/850,991, filed on Sep. 6, 2007, now Pat. No. 8,186,657.

(51) Int. Cl.
| | | |
|---|---|---|
| *F16F 9/02* | (2006.01) | |
| *F16F 9/05* | (2006.01) | |
| *B60G 11/27* | (2006.01) | |
| *F16F 9/04* | (2006.01) | |

(52) U.S. Cl.
CPC ............. *F16F 9/057* (2013.01); *B60G 11/27* (2013.01); *F16F 9/04* (2013.01); *B60G 2202/152* (2013.01); *Y10T 29/49252* (2015.01); *Y10T 29/49826* (2015.01)

(58) Field of Classification Search
CPC ........................................................ F16F 9/049
USPC ............... 267/35, 64.11, 64.21, 64.23, 64.24, 267/64.27, 122, 256; 280/124.157; 105/198.1
See application file for complete search history.

(56) References Cited

U.S. PATENT DOCUMENTS

| | | | | |
|---|---|---|---|---|
| 1,459,892 A | | 6/1923 | Hughes | |
| 2,226,605 A | * | 12/1940 | Geyer et al. | 267/64.23 |
| 2,773,686 A | * | 12/1956 | Nash | 267/64.23 |
| 3,037,765 A | * | 6/1962 | Francis | 267/64.14 |
| 3,897,095 A | * | 7/1975 | Glance | B60R 19/18 267/116 |
| 4,391,464 A | * | 7/1983 | Masotti | B60R 19/18 293/120 |

(Continued)

FOREIGN PATENT DOCUMENTS

| | | |
|---|---|---|
| DE | 196 16 476 A1 | 11/1997 |
| EP | 0 160 371 A1 | 11/1985 |

(Continued)

OTHER PUBLICATIONS

Translation of EP 130 264 A2.

(Continued)

*Primary Examiner* — Bradley King
*Assistant Examiner* — Stephen Bowes
(74) *Attorney, Agent, or Firm* — Jason A. Houser; Fay Sharpe LLP (57) ABSTRACT

A modular piston assembly is associated with an air spring assembly that has a bellows rolling over a surface of the piston assembly. The modular piston assembly includes a first piston portion adapted to fasten to an associated air spring bellows. A second piston portion separate from the first portion, is adapted to fasten to an associated mounting component. Interlocking members are provided to secure the first and second piston portions together, and/or any desired intermediate piston portions. Discrete air reservoirs may also be included in the modular piston assembly to increase the volume of the air spring.

5 Claims, 13 Drawing Sheets

(56) References Cited

U.S. PATENT DOCUMENTS

| | | | |
|---|---|---|---|
| 4,669,710 A * | 6/1987 | Horvat | B62D 33/0608 137/38 |
| 5,060,916 A | 10/1991 | Koschinat et al. | |
| 5,180,146 A * | 1/1993 | Schneider et al. | 267/64.27 |
| 5,382,006 A | 1/1995 | Arnold | |
| 5,509,641 A * | 4/1996 | Prinzler et al. | 267/64.19 |
| 5,954,316 A | 9/1999 | Voss | |
| 6,250,613 B1 | 6/2001 | Koeske et al. | |
| 6,290,244 B1 * | 9/2001 | Hosoya | 280/124.157 |
| 6,386,524 B1 * | 5/2002 | Levy et al. | 267/64.27 |
| 6,416,044 B1 * | 7/2002 | Warinner et al. | 267/64.19 |
| 6,691,989 B1 | 2/2004 | Leonard | |
| 7,328,887 B2 | 2/2008 | Leonard | |
| 7,500,659 B2 | 3/2009 | Levy | |
| 8,186,657 B2 | 5/2012 | Leonard | |
| 2006/0220283 A1 | 10/2006 | Leonard | |
| 2010/0127438 A1 | 5/2010 | Eise et al. | |
| 2012/0291626 A1 | 11/2012 | Westnedge et al. | |
| 2014/0054833 A1 | 2/2014 | Neitzel et al. | |
| 2014/0167337 A1 | 6/2014 | Ramsey et al. | |

FOREIGN PATENT DOCUMENTS

| | | | | |
|---|---|---|---|---|
| EP | 166702 A2 * | 1/1986 | | B60G 11/27 |
| EP | 1300 264 A2 | 4/2003 | | |
| EP | 1300264 | 4/2003 | | |
| JP | 01035135 A * | 2/1989 | | F16F 9/04 |
| WO | WO 2006/107456 A1 | 10/2006 | | |
| WO | WO-2007/104671 | 9/2007 | | |

OTHER PUBLICATIONS

Translation of DE 196 16 476 A1.
European Search Report.

* cited by examiner

FIG. 18 ated assembly of the modular piston assem-
AIR SPRING MODULAR PISTON

This application is a continuation of U.S. patent application Ser. No. 11/850,991, filed on Sep. 6, 2007, which is hereby incorporated herein by reference in its entirety.

BACKGROUND OF THE DISCLOSURE

This disclosure generally relates to an air spring assembly and more particularly to a modular piston arrangement for an air spring assembly. More specifically, this disclosure relates to air springs in which pistons are typically rolling-lobe type and are commonly a one-piece construction. Occasionally, the one-piece piston is mounted on top of one or more spacers. It will be appreciated, however, that the disclosure may find use in related applications and environments.

Air spring assemblies are well known in the art. For example, U.S. Pat. No. 6,250,613 is commonly-owned by the assignee of the present application and is directed to an air spring assembly of this general type. The disclosure of U.S. Pat. No. 6,250,613 is incorporated herein by reference. Generally, a pneumatic spring or air spring assembly includes a flexible rubber sleeve or bellows that contains a pressurized supply of air. Opposite ends of the bellows are secured to end members, typically referred to as a first end, or bead plate, and a second end, or piston. In response to loads imposed on the wheels of a vehicle, the piston moves relative to the bead plate and the air housed in the bellows provides a reaction force. The bellows rolls down along an external surface of the piston during this travel, and at maximum compression, the bellows will cover most of the external surface of the piston. However, it will be appreciated that the bellows does not typically extend past the piston at maximum compression, i.e., the bellows will not roll along or cover any portion of the external surface of the spacer(s).

A large variety of vehicles results in a similarly wide variety of air spring assemblies. More particularly, the air spring assembly must be able to accommodate different heights and diameters. Although it is known to use a piston with a spacer, for example as shown and described in U.S. Pat. No. 6,250,613, the timing and performance of the bellows interaction with the piston profile is not always ideal.

A need exists for greater design flexibility to replace the one-piece construction pistons as are conventionally used. Additionally, mounting options must be provided for fastener flexibility, as well as further component sharing.

SUMMARY OF THE DISCLOSURE

A modular piston assembly for use in an associated air spring assembly that includes a bellows rolling over the surface of the piston assembly when fully compressed includes a first piston portion adapted to fasten to the associated air spring bellows, and a second piston portion, separate from the first portion, that is adapted to fasten to an associated mounting component.

The modular piston assembly further includes at least one intermediate piston portion having a first end adapted to interconnect with the first portion, and an axially spaced second end adapted to interconnect with one of another intermediate piston portion or the second portion.

The assembly includes means for interlocking the first and second piston portions together.

In one arrangement, the interlocking means includes lateral locking means having a recess along an outer periphery of each piston portion that is received in a mating recess along an inner periphery along each adjacent piston portion.

Each piston portion preferably includes a central hub interconnected to a continuous perimeter wall by radially extending portions. The piston portions of the modular assembly may be non-metallic, metallic, composite, or combinations thereof.

The first piston portion preferably includes an axially projecting member for snap-on attachment to the bellows.

In another embodiment, plural discrete air reservoirs are provided in the modular piston and sealed around openings provided in a top piston portion to increase the volume of air available to the air spring and vary the spring rate as desired without impacting the interlocking means or central hub construction of the modular piston assembly.

A primary benefit of the present disclosure is to reduce component cost.

Another advantage of the disclosure is that an array of modular piston components can replace several one-piece construction pistons, providing greater design flexibility.

Another feature of the disclosure resides in the optimization that can be obtained with a modular piston.

Yet another benefit is found in the mounting options that provide for fastener flexibility and component sharing.

A further benefit resides in the ability to effectively use the internal volume of the modular piston assembly for increasing the overall volume of air spring.

Still other advantages and benefits relating to this disclosure will become apparent from reading and understanding the following detailed description.

DETAILED DESCRIPTION OF THE PREFERRED EMBODIMENTS

Figure 1:
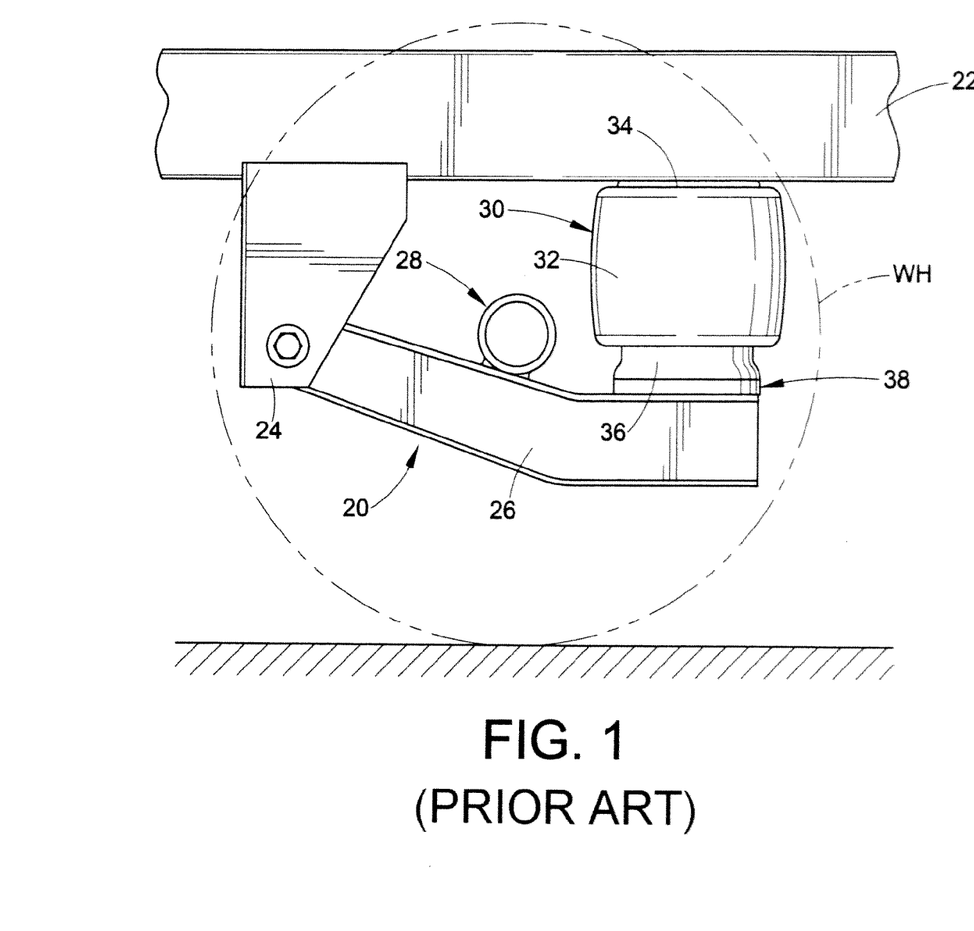
FIG. 1 is a prior art showing of a side elevational view of a suspension assembly mounted to a frame member in a vehicle incorporating an air spring assembly.

Turning first to FIG. 1, a suspension assembly 20 is mounted to a frame member 22 of a vehicle. The suspension assembly may include a bracket 24 from which a suspension member 26 is movably mounted. Axle 28 is commonly secured to the suspension member and, thus, movable with respect to frame member 22. Wheel WH is shown in phantom.

The suspension member 26 is also interconnected to the frame member 22 via air spring assembly 30. For purposes of FIGS. 1 and 2, it is understood that a known air spring assembly 30 includes a bellows 32 that extends between a first end member or bead plate 34 and a second end member or piston 36. One or more spacers 38 are occasionally provided below the piston to expand the design envelope of the air spring assembly to fit the particular need. As more particularly detailed in FIG. 2, a second or lower end 50 of the bellows is secured along an inner perimeter portion by a clamp plate 52. Aligned openings 54, 56 in the lower face of the piston and extending through the spacers, respectively, receive fasteners 58 to secure the lower end of the air spring assembly to the suspension member 26.

Figure 2:
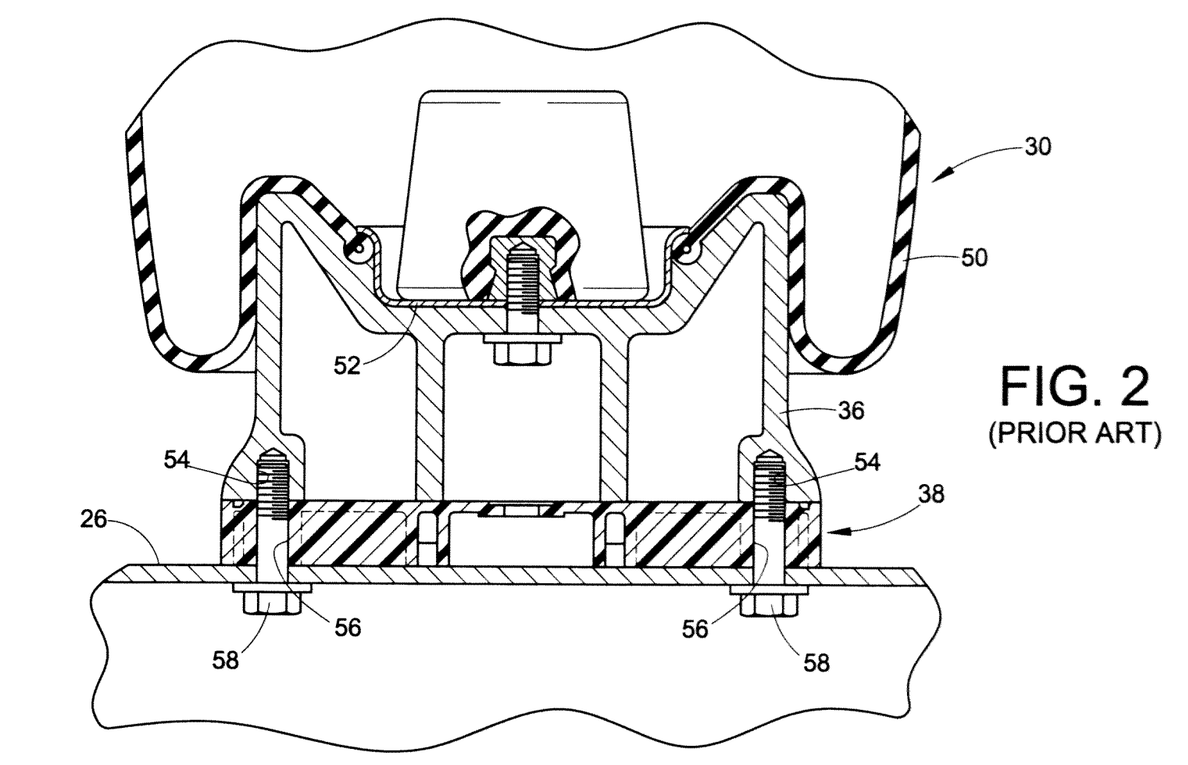
FIG. 2 is an enlarged fragmentary, longitudinal cross-sectional view of a portion of the air spring assembly.

As is particularly evident in FIG. 2, it is common for the piston 36 to be a one-piece assembly, either metal or fabricated from a substantially non-corrosive material such as a plastic or fiber-reinforced plastic (or a composite, or combination thereof), and likewise the same is true for the construction of the spacer. The delineation between the piston and the spacer is known to those skilled in the art, and it is generally recognized that the piston encompasses that surface over which the bellows will extend in a fully collapsed condition and the spacer(s) are interposed between the piston and the suspension member. Thus, the spacer 38 is not intended to receive a portion of the bellows over an external surface even in a fully compressed condition of the air spring assembly.

Figure 3:
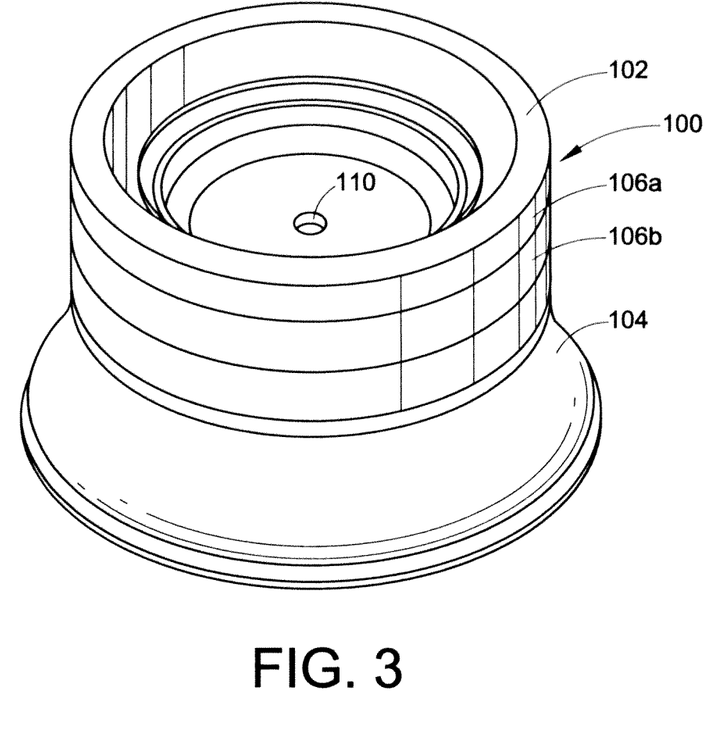
FIG. 3 is a perspective view of modular piston assembly.
Figure 4:
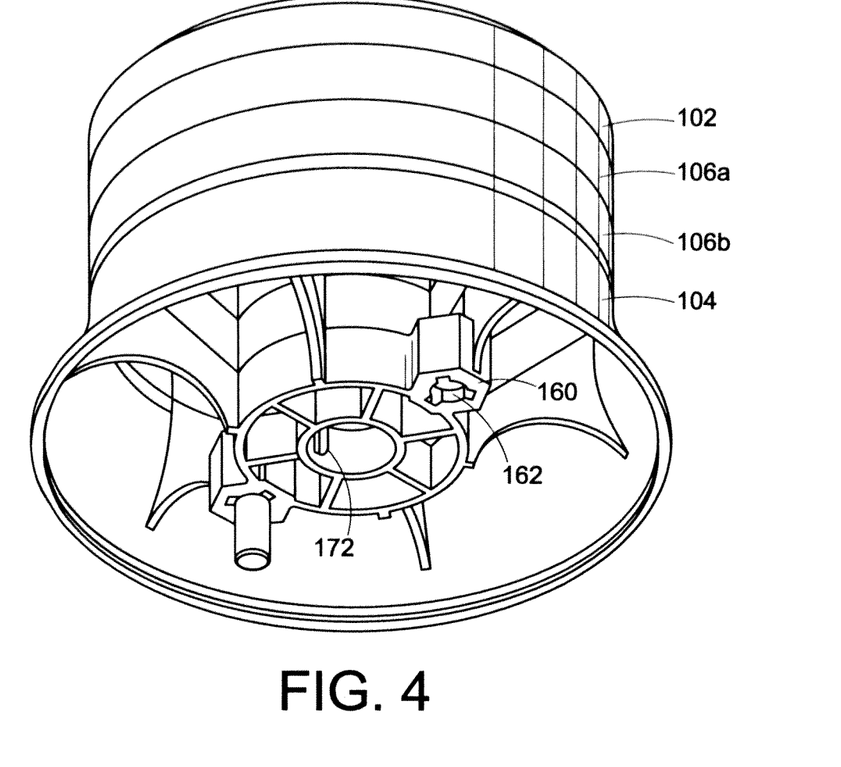
FIG. 4 is a bottom view of the modular piston assembly of FIG. 3.

FIGS. 3 and 4 illustrate a preferred embodiment of a modular piston assembly 100 used in an air spring assembly, for any desired end-use including a suspension assembly of the type shown and described with respect to FIGS. 1 and 2. More particularly, the piston assembly is shown in assembled relation in FIGS. 3 and 4. It includes a first or upper piston portion 102 that is adapted to be secured to an associated air spring bellows (for example, bellows 30 shown and described in FIGS. 1 and 2). A second or bottom piston portion 104 is adapted to fasten to an associated mounting component. Again, depending on the end use of the air spring assembly and particularly the modular piston assembly, the associated mounting component could be a suspension member, mounting surface, or even a spacer, such as spacer 38 shown in FIG. 2. In addition, one or more intermediate members 106 are interposed between the first and second piston portions 102, 104. As will become more apparent, two intermediate portions 106*a*, 106*b* are shown in FIGS. 3-6.

When assembled, the modular piston assembly has a relatively continuous, smooth-walled, outer surface formed by outer perimeter portions of each of the piston portions 102, 104, 106*a*, 106*b*. In this embodiment, each of the first and intermediate piston portions has substantially the same outer diameter, while piston portion 104 begins at the same outer diameter or outer dimension and gradually increases or bells outwardly to an increased dimension at a lower, terminal end thereof. One skilled in the art will appreciate, however, that the final configuration of the assembled modular piston assembly may vary by using mating piston portions having individually varying contours or configurations, or piston portions that in combination form varying contours or configurations. For example, the final piston profile when assembled could be straight, negative taper, positive taper, hour-glass, flared, or any other desired piston profile or combinations of these profiles. Conceptually, each of the interconnected piston portions, however, will provide a smooth external profile when joined together so that a bellows could easily extend over the continuous smooth profiled surface.

Figure 5:
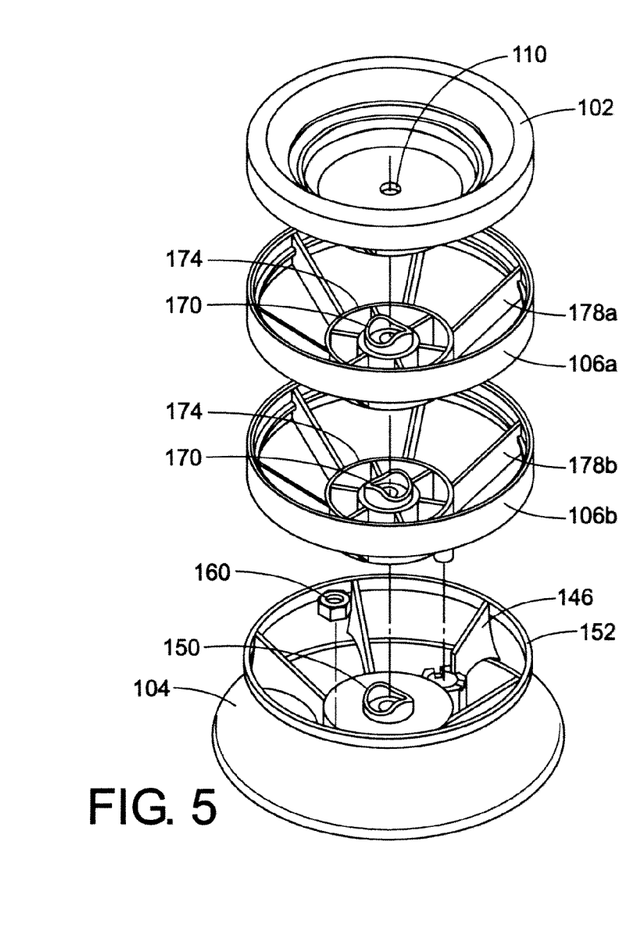
FIG. 5 is an exploded view of the modular piston assembly of FIG. 3.
Figure 6:
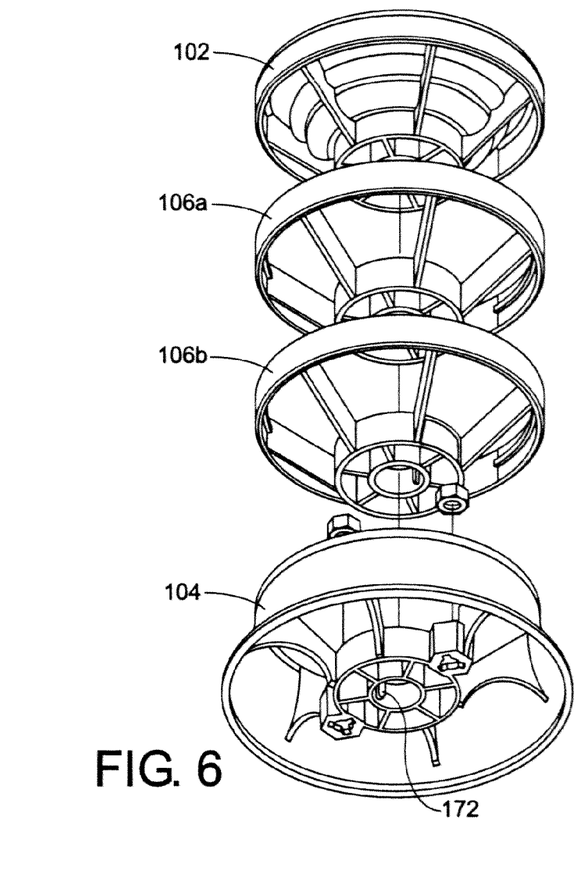
FIG. 6 is another exploded view of the modular piston assembly of FIG. 3.
Figure 7:
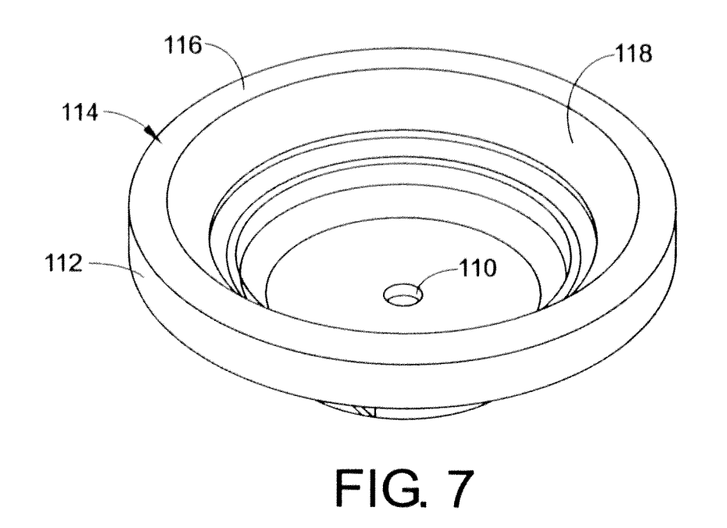
FIG. 7 is a perspective view of the upper surface of a first portion of the modular piston assembly of FIG. 3.
Figure 8:
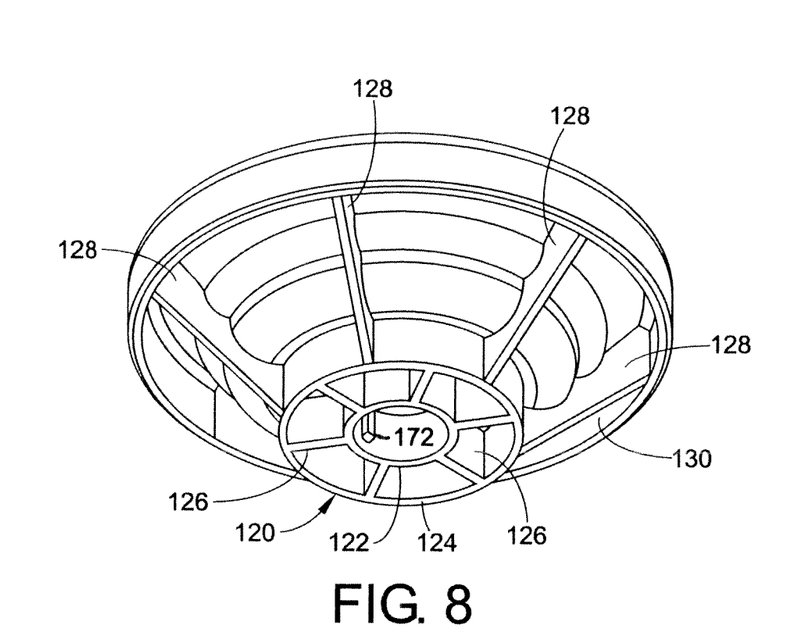
FIG. 8 is an underside perspective view of the first piston portion shown in FIG. 7.

In FIGS. 3, 5, and 7, a fastener receiving opening 110 is provided in a central region of the first piston portion. The opening is adapted to receive a fastener (for example as shown in FIG. 2) for securing the modular piston assembly to an associated structure or bellows. In addition, and as shown in the exploded views of FIGS. 5 and 6 and individually shown in FIGS. 7 and 8, outer perimeter 112 of the first piston portion is shown as being generally constant over its axial length. An upper surface 114 has smooth rounded edge 116 that transitions from the outer perimeter to the concave central portion 118. Stepped regions may also be provided in the concave surface 118 to accommodate the bead of the bellows and clamp member (such as clamp member 52 as shown in FIG. 2) for securing the bead of the bellows to the piston assembly. An underside of the first piston portion includes a hub 120 preferably defined by concentric ring members 122, 124. The ring members are generally co-planar and interconnected by circumferentially spaced, radially extending arms 126. These arms thus interconnect the outer perimeter portion of the inner ring member 122 with the inner peripheral surface of the outer ring member 124. In addition, additional radial arms 128 extend in circumferentially spaced fashion from an outer diameter surface of the ring member 124. This group of radial arms 128 not only extends in a radial direction, but also extends longitudinally to support the surface 118 from the rear side as well as the outer perimeter portion 112. Thus, the arms 128 extend from the outer perimeter of ring member 124 to the interior perimeter 130 of the first piston portion. As a result of this structure, the co-planar ring members 122, 124 are axially offset from outer perimeter 112 of the modular piston portion but need not necessarily be co-planar. As evident in FIG. 6, the first piston portion has a generally cone-shaped configuration, although other conformations may be used without departing from the scope and intent of the present disclosure.

Figure 9:
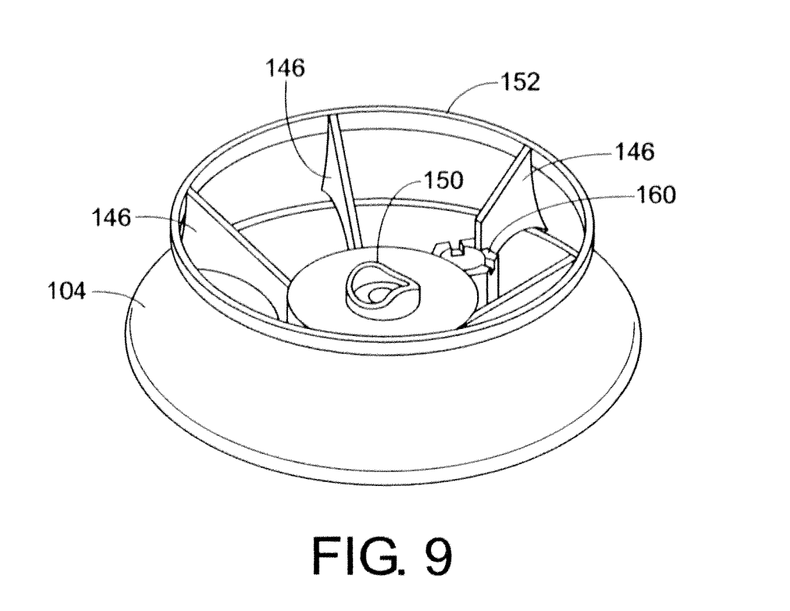
FIG. 9 is a perspective view of an upper surface of a second piston portion.
Figure 10:
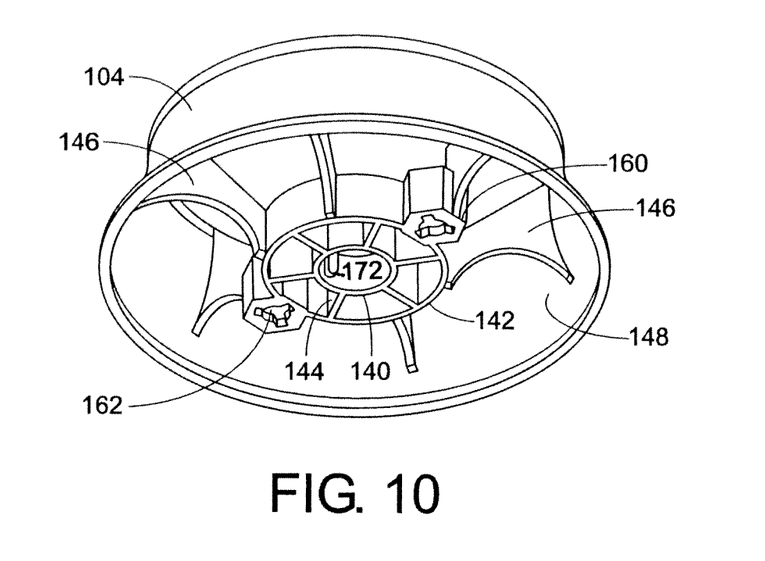
FIG. 10 is a perspective view of a lower surface of the second piston portion of FIG. 9.

Second piston portion 104 is illustrated in the assembled relation of FIGS. 3 and 4, in the exploded views of FIGS. 5 and 6, and individually shown in FIGS. 9 and 10. The second piston portion includes first and second ring members 140, 142 that are preferably co-planar. The ring members are interconnected by circumferentially spaced, radially extending ribs 144. In addition, circumferentially spaced radial support arms 146 extend radially from the outer perimeter of ring member 142 to the inner perimeter 148 of the perimeter surface. In addition, a generally planar surface 150 (FIG. 9) closes off an interior end of the first and second ring members 140, 142. This surface is axially offset from rim 152 that defines the upper extent of the second piston portion, although the rim need not necessarily be used. It will be appreciated that the radial arms 146 extend axially between the support surface 150 and rim 152. Moreover, the same number of radial arms 146 and the same circumferential spacing are desired so that when properly oriented relative to the first piston portion 102, the radial arms define segmented but axially aligned radial arms in the final assembly of the modular piston assembly.

In addition, fastener receiving means 160 are provided in the second piston portion for securing the modular piston assembly to a structural member such as a suspension support arm or spacer, or still another support surface. To facilitate ease of assembly, the fastener receiving means 160 preferably has a cavity that is shaped for mating, snap-feature receipt and retention of the head of a fastener. For example, shown here, the cavity is hex-shaped to receive and retain the head of a hex-head bolt or a hex-nut (see FIGS. 5 and 6). The mating relation serves as an anti-rotation means for ease of assembly and the snap-feature holds the fastener in place. The threaded end of the fastener extends through opening 162. As noted previously, the second piston portion preferably has a bell-shape, although other piston configurations may also be adopted without departing from the scope and intent of the present invention. It will also be understood that the first and second portions may be connected in directly abutting relation such that opening 110 in the first piston portion is aligned with opening 164 (FIG. 4) in surface 150. This permits receipt of an elongated fastener through the aligned openings to secure the modular piston assembly to a clamp member of a bellows (FIG. 2) and also secure the separate piston portions together into assembled relation.

In addition, the piston portions may include indexing or alignment means, for example of the type shown and described in commonly-owned application WO 2006/107456, the disclosure and details of which are expressly incorporated herein by reference. This self-alignment or indexing feature will be generally identified by reference numerals 170, 172. As a result of inter-engagement between these indexing features 170, 172, the piston portions of the modular piston assembly, and/or the piston assembly and any associated spacer or mounting surface can be brought into desired alignment or registration relative to one another. Since the structure and operation of this indexing means is already known from the commonly-owned published application, further description is unnecessary herein to form a good understanding of the present disclosure. Moreover, it will be understood that each of the piston portions includes at least one component of the self-indexing means so that when the piston portions are assembled together, one component cooperates with the mating indexing component to provide desired circumferential alignment of the respective piston portions. This may be desirable, for example, to register or align the radial arms to define continuous, segment radial arms along the length of the modular piston assembly. In other instances, such as the second piston portion and intermediate piston portions to be described further below, cooperating indexing features of each type 170, 172 may be provided at axial opposite ends of the piston portion in order to cooperate with adjacent indexing features of abutting members. Thus, as best evident in FIGS. 9 and 10, the central rings 140, 142 are co-planar (but need not necessarily be co-planar) with the lower, outer edge of the second piston portion, and, likewise, are recessed relative to rim 152 so as to receive the cone-shaped projection of the first piston portion, or an intermediate piston portion as will be described further below. Of course, another type of interlocking arrangement may be used, such as a tongue and groove assembly, without departing from the present disclosure. Further, overlapping edges defined by recessed conformations along the lower edge of the first piston portion and the upper rim 152 of the second piston portion provide for confirmed receipt of the mating engagement between the piston portions, and also define a smooth, continuous external piston profile for receipt of the bellows thereover. Moreover, the overlapping edges advantageously transfer the lateral load between the components and provide the desired hoop stress for the assembly.

Figure 11:
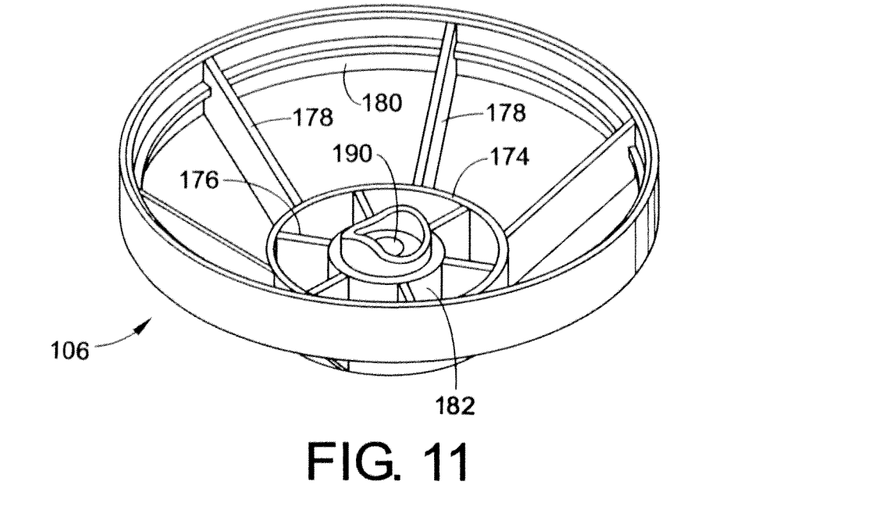
FIG. 11 is a perspective view of an upper surface of a third or intermediate piston portion.
Figure 12:
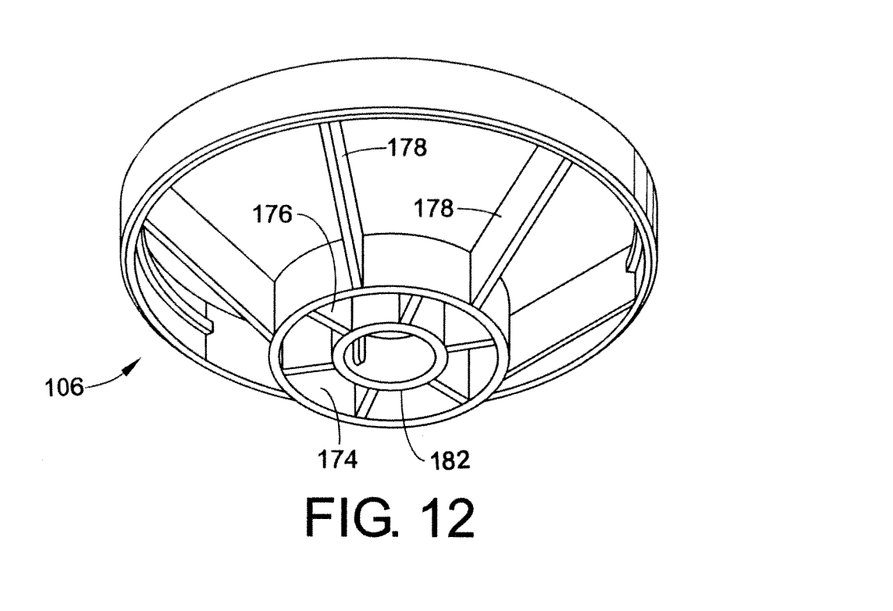
FIG. 12 is a perspective view of the lower surface of the third or intermediate piston portion of FIG. 11.

With continued reference to FIGS. 3-10, and additional reference to FIGS. 11 and 12, provision is also provided for one or more intermediate piston portions 106. An intermediate piston portion includes a first, small diameter ring member or annular portion 182 and a second ring member or annular portion 174 of slightly greater diameter, and that are interconnected in co-planar fashion by circumferentially spaced, radial arms 176. The radial arms extend from the outer perimeter of the first ring member 172 to the inner diameter of the ring 174. Further, a second set of circumferentially spaced, radial arms 178 proceed from the external perimeter of the second ring member 174 to an inner surface portion 180. Moreover, the co-planar ring members are axially off-set from the external perimeter of the intermediate piston portion 106 so that the radial arms 178 extend at an angle less than perpendicular to the outer surface of the second ring member and likewise inner surface 180. Of course, it will be recognized that the ring members need not be co-planar and instead could be inverted, flat, or disposed at other angles as necessary. Further, central opening 190 is dimensioned to receive a fastener therethrough that interconnects the first and second piston portions together. Further indexing means are provided on the intermediate piston portion.

Figures 13, 14:
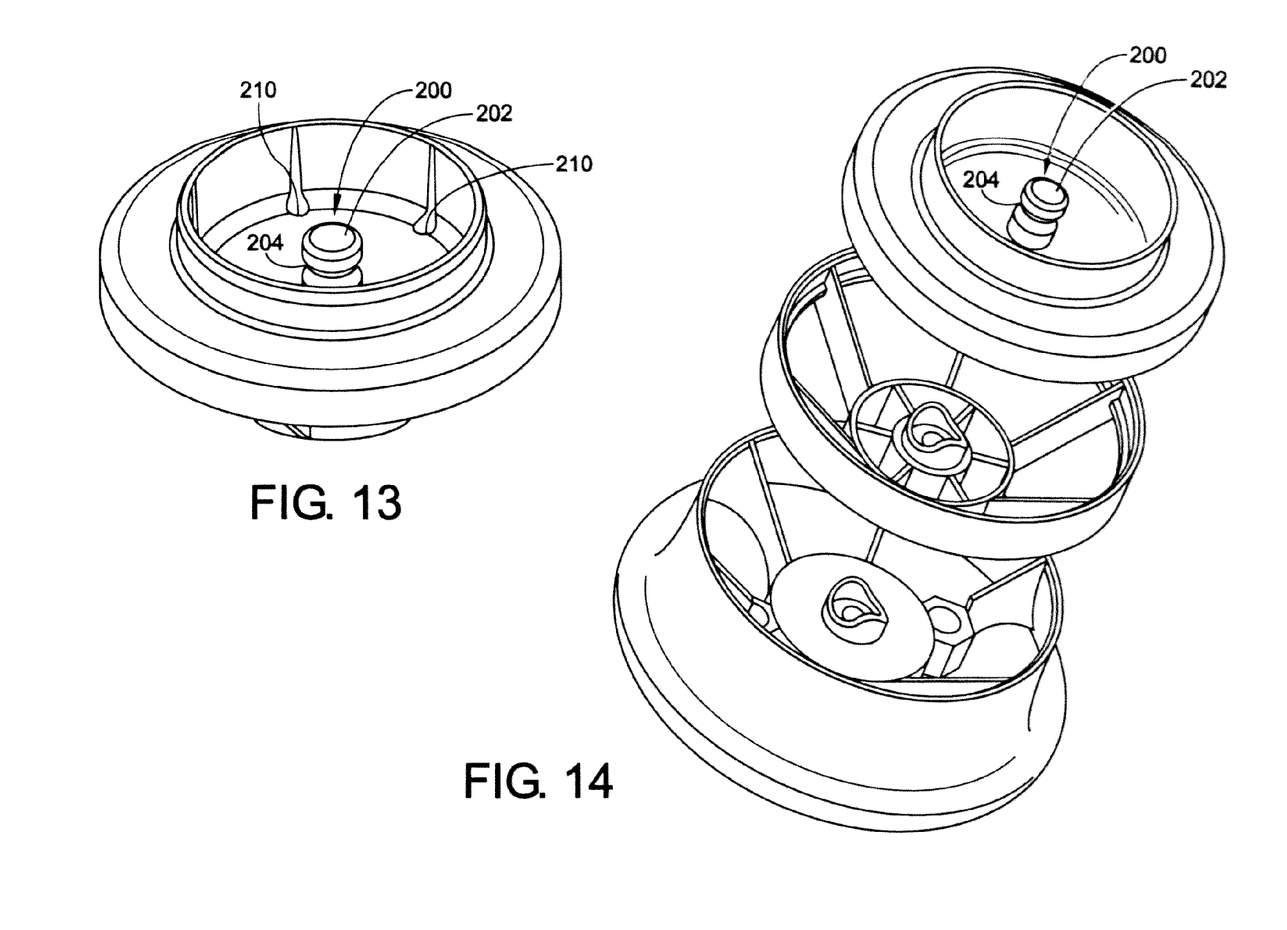
FIG. 13 is a perspective portion of a modified piston assembly.
FIG. 14 is an exploded view of the modular piston assembly of FIG. 13.

FIGS. 13 and 14 illustrate a similar modular piston assembly in which the first piston portion has been slightly modified for connection with the bellows. For ease of illustration and understanding, like reference numerals will identify like components, while new numerals will be used to identify new components. It is also evident from a comparison of FIGS. 5 and 14 that only one intermediate piston portion is shown in the embodiment of FIG. 14, as contrasted to plural intermediate piston portions in FIG. 5. Again, depending upon the particular needs of the desired axial length of the final piston assembly, then the determination is made whether one or more intermediate piston portions are required. Of course, in the shortest version, no intermediate piston portion is used and the piston assembly is comprised of the top and bottom piston portions.

Shown in FIGS. 13 and 14 is a connector 200 having a generally mushroom-shaped configuration formed by enlarged head 202 and an undercut recess 204. This permits a snap-fit connection with a jounce assembly or other structure associated with the bellows of the air spring assembly. The underside of the connector is preferably internally threaded so that a fastener extending through the second piston portion, intermediate piston portions, and then threaded into the underside of the connector will still hold the individual portions of the modular piston assembly together.

In summary, a modular piston assembly includes a top section that mounts to an air spring, a lower section that mounts to a spaced member or suspension component, and also includes one or more intermediate sections to achieve a specified height, or used without intermediate sections. Ideally, the modular piston assembly will have smooth transitions between sections that will make up a continuous piston profile with a bellow to interface. The sections should have some method of interlocking to remain concentric as to prevent lateral shifting and portions of the sections for moving relative to one another laterally. The sections may also benefit from being rotationally aligned so that structural members may line up to transfer loads appropriately. Thus, an indexing feature may be needed. The sections provide portions of the piston profile that, when assembled, collectively achieve a straight, negative taper, positive taper, hour-glass, flared, or any piston profile. It would be beneficial if all the profiles shared at least one section for cost purposes, but not absolutely necessary.

Typically, several one-piece constructions are available for an air spring assembly design in combination with a given bellow length, but the optimal piston design lies somewhere in between. The proposed modular piston assembly design could more closely achieve an optimal piston profile or height by stacking the appropriate sections, thus allowing further design flexibility. Also, several one-piece pistons can be provided that are essentially the same, except the fasteners that mount the spaced member or suspension are different. A modular design would allow top and intermediate sections to be shared while only changing the lower section, or possibly using a common lower section with insertable fasteners that are installed during assembly.

Figure 15:
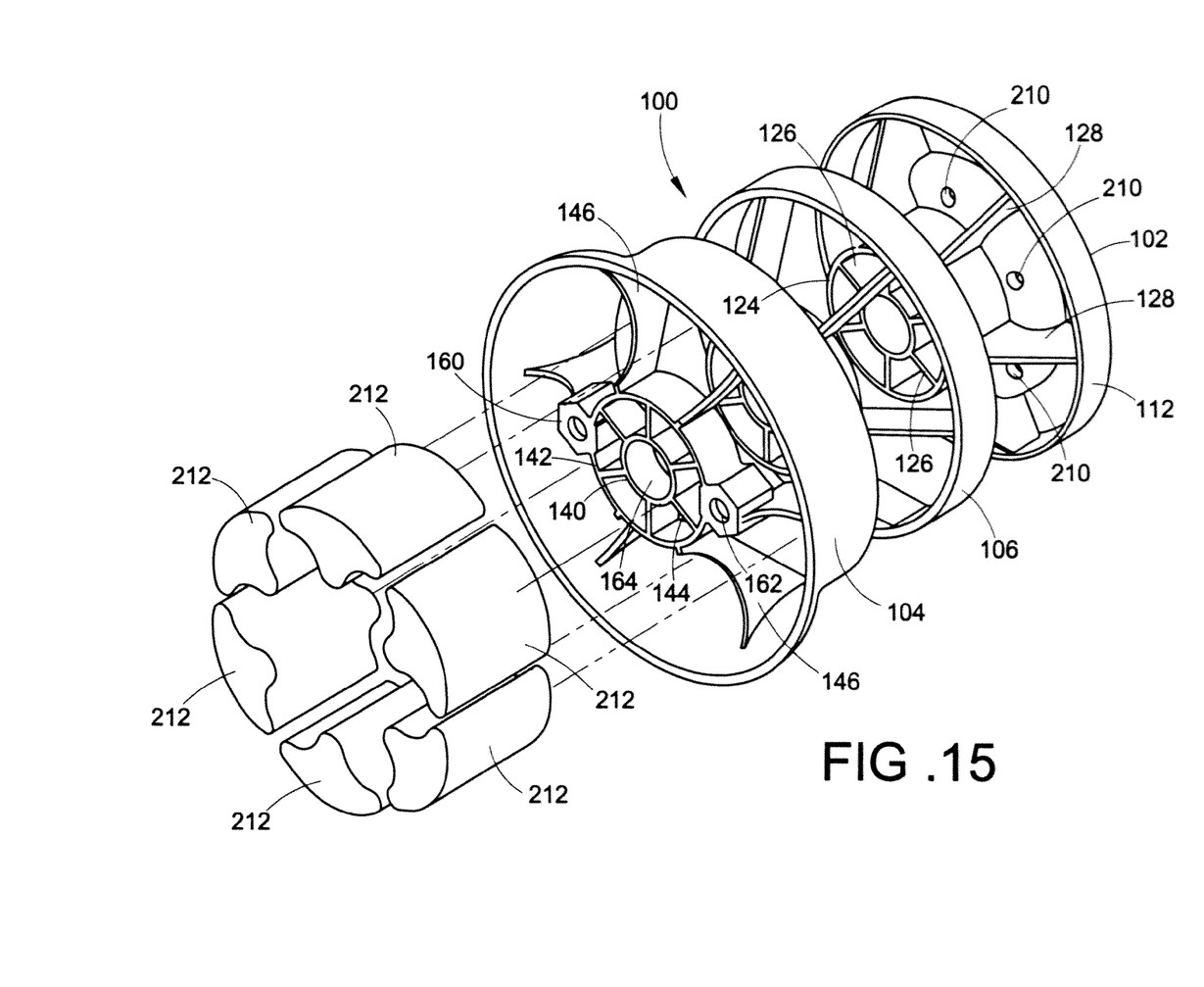
FIG. 15 is an exploded view of the modular piston assembly incorporating discrete air reservoirs.
Figure 16:
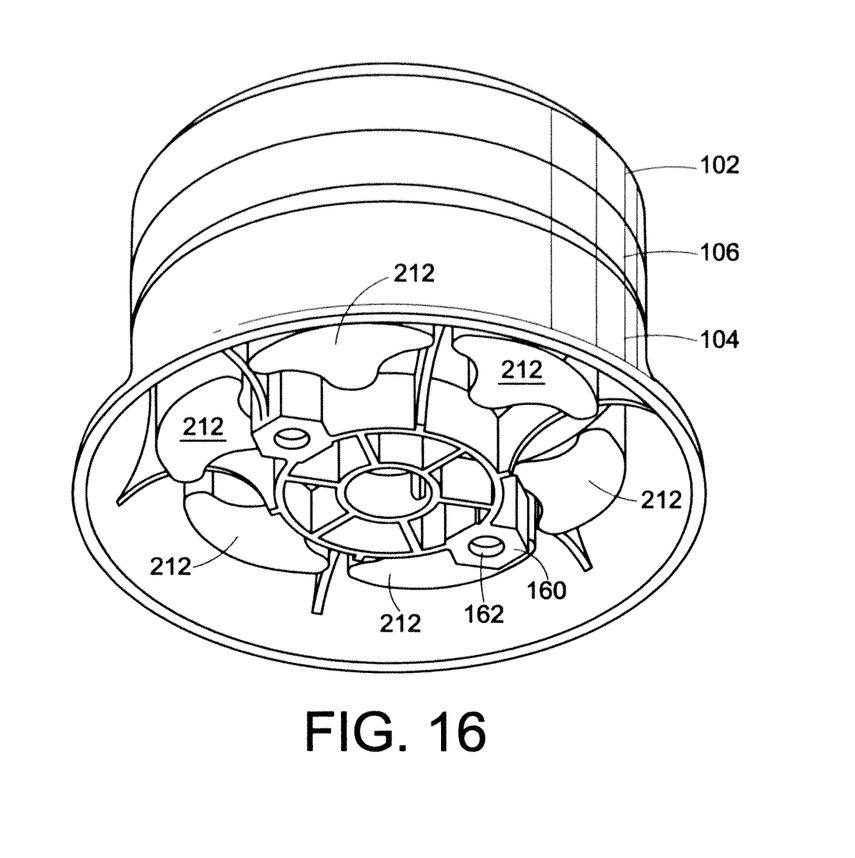
FIG. 16 is an assembled view of the embodiment of FIG. 15.
Figure 17:
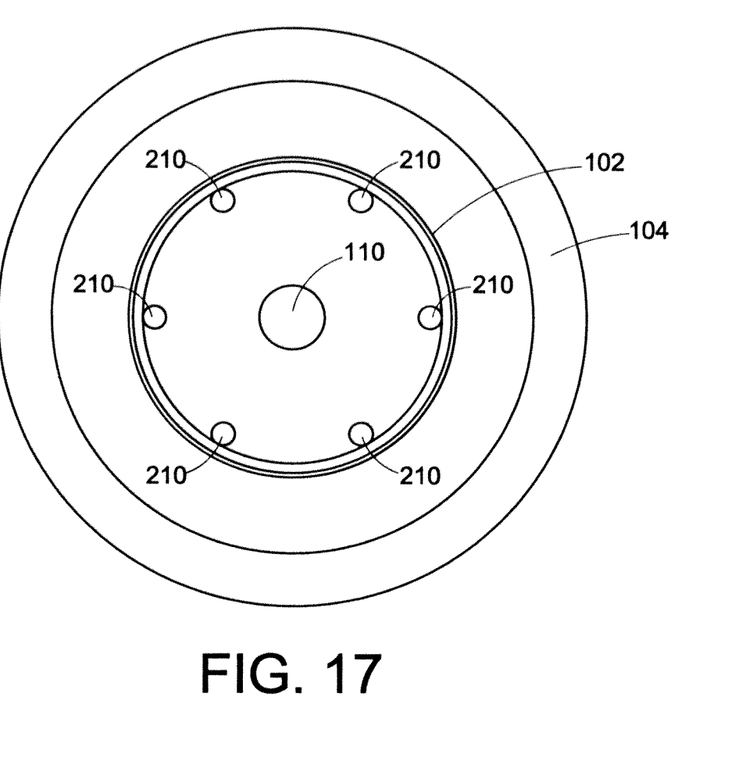
FIG. 17 is a top plan view of the upper surface of the first piston portion.
Figure 18:
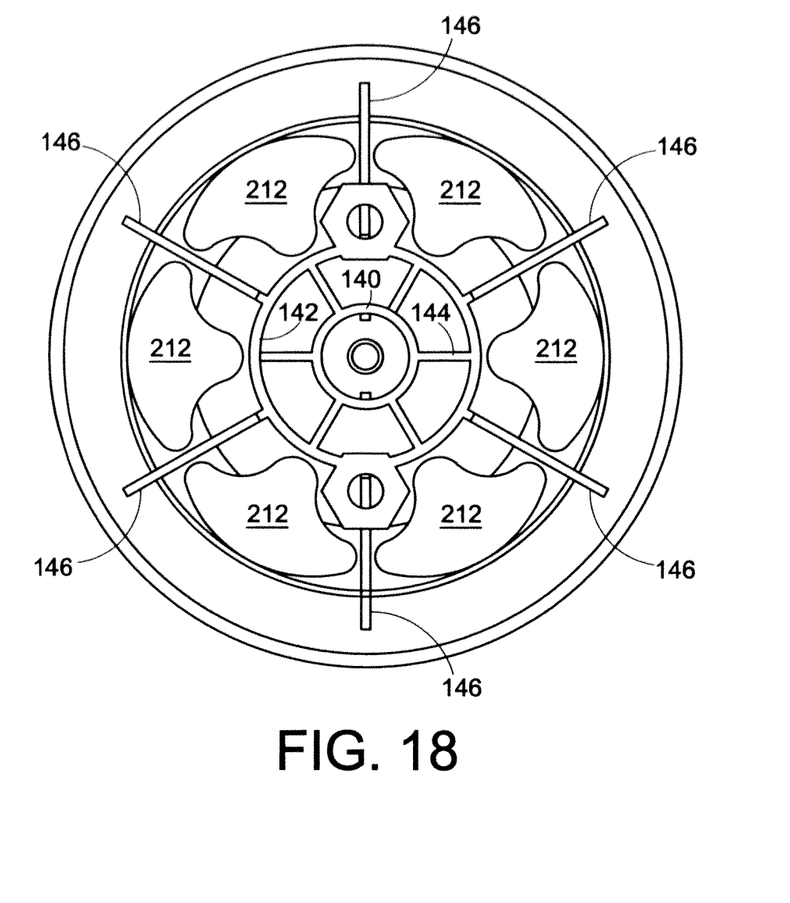
FIG. 18 is a bottom plan view of the undersurface of the assembled modular piston assembly of FIG. 15.

Another embodiment of a modular piston assembly is shown in FIGS. 15-18. For ease of reference and understanding, the description of this embodiment will focus on the differences or additions relative to the above-described embodiments, and will otherwise presumed to be identical to the earlier embodiment unless noted otherwise. More particularly, the first or upper piston portion 102 includes a series of circumferentially spaced openings 210 located radially outward of the central fastener receiving opening 110. These openings 210 communicate with the interior cavity of the bellows and thus permit the total volume of air of the air spring to be increased and provide a different spring rate if so desired. Here, individual or discrete air reservoirs 212 (six of which are illustrated in FIGS. 15, 16, and 18) each communicate with one of the openings 210 to establish air communication with the interior of the bellows. Six air reservoirs are used in this particular embodiment since there are six radial arms circumferentially spaced around each of the piston portions, and thus define six cavities between each pair of adjacent arms. The axial length of each reservoir depends on the length of the piston portions that are assembled to form the piston. Thus, it will be appreciated that different volume reservoirs may be used for different piston portion configurations or different desired total volumes, or, in some instances, one may not need all of the discrete reservoirs 212. Likewise, although the six reservoirs are shown to be substantially identical to one another, there may be circumstances where the reservoirs may be dissimilar without departing from the scope and intent of the present disclosure.

The particular configuration of each reservoir is not critical (even though the collective volume is important) although the reservoir should be shaped to allow the individual reservoirs to be axially inserted between the aligned radial arms of the different piston portions as illustrated in FIG. 15. Preferably each reservoir 212 is sealed to the upper piston portion along a lower interior surface thereof so that the pressure in the bellows is maintained. These components can be formed as a part of the upper piston portion, or separately formed and then adhered to the lower surface of the upper piston portion, or welded thereto (e.g., ultrasonically or spin welded if the particular cross-sectional configuration permits same). When used with the snap-fit connector 200, 202, 204 of FIG. 13, a greater amount of reservoir volume is provided. This reservoir arrangement provides for a wider range of applications of the air spring assembly.

While the subject disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the present disclosure. Obviously, modifications and alterations will occur to others upon reading and understanding the preceding detailed description. For example, different materials of construction can be used. Accordingly, it is to be distinctly understood that the foregoing descriptive matter is to be interpreted merely as illustrative of the present concept and not as a limitation. As such, it is intended that the subject concept be construed as including all such modifications and alterations in so far as they come within the scope of the appended claims and any equivalents thereof.

Having thus described the invention, it is now claimed:
1. A gas spring assembly comprising:
a flexible wall extending longitudinally between opposing ends and peripherally about a longitudinally-extending axis to at least partially define a spring chamber;
a first end member operatively connected across the first end of the flexible wall;
a first piston section secured along the second end of the flexible wall, the first piston section including a plurality of openings extending therethrough that are dimensioned for fluid communication with the spring chamber, the first piston section having a first end adapted to engage the flexible wall and an opposing second end, and the first piston section including an outside wall extending peripherally about the axis, a first structural feature and a first indexing feature disposed along the second end in a first predetermined rotational orientation about the axis relative to the first structural feature;
a second piston section that is separate from the first piston section and adapted for securement on an associated mounting component, the second piston section including a first end, an opposing second end adapted to engage the associated mounting component, an outside wall extending circumferentially about the axis, a second structural feature and a second indexing feature complementary to the first indexing feature, the second indexing feature disposed along the first end of the second piston section in a second predetermined rotational orientation about the axis relative to the second structural feature; and,
a plurality of discrete air reservoirs received within at least the second piston section and dimensioned to communicate with the spring chamber through at least one of the plurality of openings in the first piston section;
the first and second piston sections being adapted to cooperatively engage one another such that upon axial displacement of the first and second piston sections toward one another during assembly and prior to securement of the first and second piston sections to one another:
  i) the first and second indexing features interengage one another and thereby cause the first and second piston sections to rotate relative to one another such that the first and second structural features are at least approximately aligned with one another and form a plurality of openings for receiving one or more of the plurality of discrete air reservoirs; and,
  ii) the outside walls of the first and second piston sections form a substantially continuous outer surface dimensioned for displacement of a rolling lobe of the flexible wall therealong.
2. The gas spring assembly according to claim 1 further comprising at least one intermediate piston section, separate from the first and second piston sections, having a first end adapted to interconnect with the first piston section and an axially-spaced second end adapted to interconnect with one of another intermediate piston section or the second piston section.

3. The gas spring assembly according to claim 1, wherein each of the first and second piston sections includes a central hub, and the first and second structural feature respectively of the first and second piston sections each include two or more radially-extending walls interconnecting the central hub with the outside wall thereof such that adjacent ones of the two or more radially-extending walls at least partially form one of the plurality of openings for receiving one or more of the plurality of discrete air reservoirs.

4. The gas spring assembly according to claim 1, wherein at least one of the first and second indexing features includes at least two occurrences of a geometric pattern formed along a portion thereof such that the first and second piston sections are caused to rotate relative to one another into one of two or more predetermined rotational orientations.

5. The gas spring assembly according to claim 1, wherein the second piston section includes a cavity wall at least partially defining an axially-extending cavity dimensioned to receive at least a portion of an associated hex-shaped fastener, the cavity wall including an anti-rotation feature for inhibiting rotation of the associated fastener and a snap-feature operative to engage the associated fastener for inhibiting axial displacement of the associated fastener.

\* \* \* \* \*